R. S. MAXWELL.
YARD TRUCK.
APPLICATION FILED AUG. 2, 1915.
1,217,479.
Patented Feb. 27, 1917.
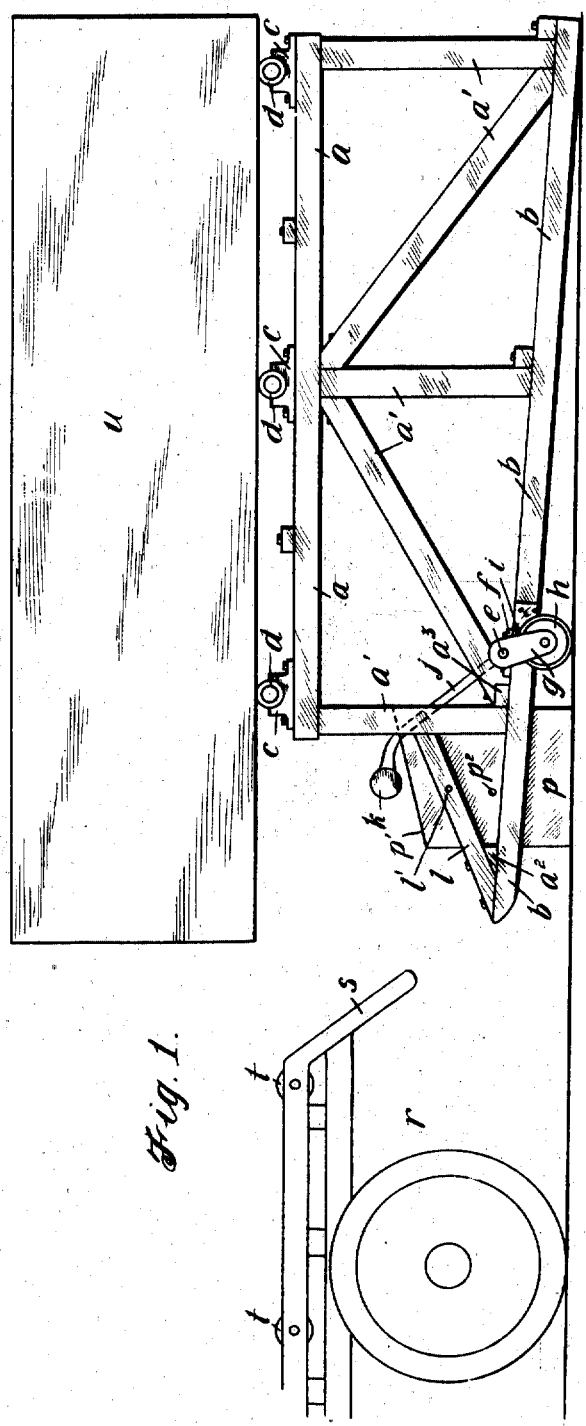
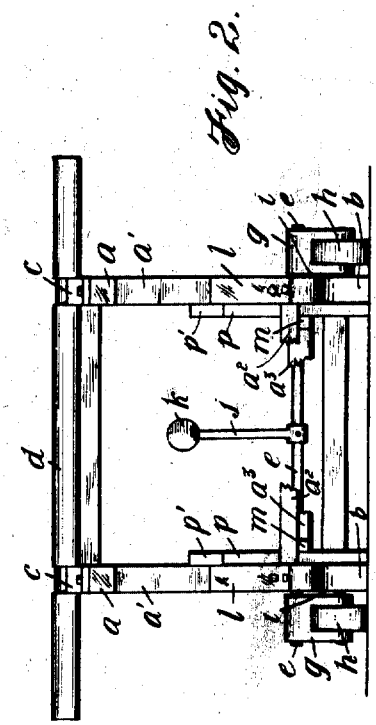
INVENTOR
Ralph S. Maxwell
BY
ATTORNEY

UNITED STATES PATENT OFFICE.

RALPH S. MAXWELL, OF PORTLAND, OREGON, ASSIGNOR OF ONE-HALF TO JULIA M. PARKER, OF PORTLAND, OREGON.

YARD-TRUCK.

1,217,479.  Specification of Letters Patent.  Patented Feb. 27, 1917.

Application filed August 2, 1915. Serial No. 43,327.

*To all whom it may concern:*

Be it known that I, RALPH S. MAXWELL, a citizen of the United States, and a resident of Portland, county of Multnomah, and State of Oregon, have invented a new and useful Improvement in Yard-Trucks, of which the following is a specification.

This invention relates to loading devices known as yard trucks used in lumber yards or other yards of similar character, where portable bodies are used. These bodies are loaded in the yard and are then transferred to delivery trucks. Prior to my invention, much time and labor was involved in the transfer of portable bodies from a yard truck to a delivery truck, and therefore, one of the main objects of this invention is to provide a yard truck so constructed as to facilitate the transfer of such body.

Another of the main objects of my invention is to so construct the yard truck as to adapt it for coöperation with a delivery truck, to thereby make the work of transfer wholly automatic.

The details of my invention are all fully shown in the accompanying drawings, in which, Figure 1 is a side elevation of my improved yard truck with a load carried thereon, and ready for being transferred to a delivery truck. At the left end of this figure is shown a delivery truck to which the load is to be transferred, and Fig. 2 is the front elevation of the yard truck. In this view, the load is omitted, and certain portions of the frame are broken away so as to show more clearly certain other parts.

The yard truck frame comprises top members $a$, vertical struts $a'$, transverse plane struts $a^2$, and $a^3$, and skids $b$. The top frame members $a$ and the skids $b$ are not parallel, but are so arranged that when the front end of the frame is elevated to the proper position, the top members $a$ will be horizontal. Bearing boxes $c$ are fixed on the top frame members, and transverse dead-rolls $d$ are journaled in these boxes.

A transverse shaft $e$ is journaled in boxes $f$, on the skids $b$ near the forward end of the truck frame. On the outer ends of said shaft are fixed crank arms $g$, and wheels $h$ are mounted on said crank arms. Stop members $i$, are fixed on the sides of the skids, against which the crank arms $f$ are adapted to abut, when the parts are positioned as shown in Fig. 1.

A lever arm $j$ provided with a ball-head $k$ is fixed on the shaft $e$, intermediate the crank-arms $f$. The forward ends of the skids $b$ project beyond the truck frame and brace members $l$ form stays between the ends of the skids and the front strut $a'$. Additional struts $m$ extend between the transverse struts $a^2$, $a^3$, and are spaced from the brace members $l$. These members provide guide ways for the vertical blocks $p$, the upper faces $p'$ of which are beveled as shown in Fig. 1. Holes $p^2$ are provided in the blocks and holes $l'$ are provided in the brace members $l$. When the truck is to be moved, the blocks $p$ may be lifted so as to bring the holes $p^2$ and $l'$ into registration, and a bolt or pin, not shown, may be inserted through said holes to hold these parts together.

$r$ represents an auto delivery truck of standard construction, the rear end of which is provided with a rigid inclined tail-gate $s$, and rolls $t$ are journaled in the floor of the truck.

The general operation of this device is as follows: Before the yard truck is loaded, the lever $j$ is thrown forward to the position shown in Fig. 1. This action will elevate the forward end of the truck, and by reason of the crank arms being positioned slightly over center and contacting with the stops $i$, the truck will be maintained in this position.

The load, which in this case is indicated by $u$, is then placed on the yard truck, bearing directly on the dead rolls $d$. It will be noted that the forward end of the load projects beyond the forward end of the truck. When the load $u$ is to be transferred to the delivery truck $r$, the latter is backed up along the path as indicated in Fig. 1, until the inclined tail-gate $s$ strikes the beveled faces of the blocks $p$. The momentum of the truck will then cause the rear end of the latter to be lifted up, and held rigid so that when the load is transferred to the rolls $t$, the latter will not be displaced by the springs at the rear end of the truck. In this way, the load will be maintained wholly on the rolls $t$ and not on the floor of the truck. The inclined tail-gate $s$ will in the meantime have contacted with and rocked the lever $j$. As soon as the crank arms $g$ are thrown over center, the front of the truck will drop until the skids $b$ lie flat on the ground. This action will cause the front end of the load $u$ to drop and bear directly on the rear roll $t$ of the truck $r$. If the rolls $t$ are of the dead type, the load $u$ can be manually shoved forward onto the body of the truck, but if the rolls $t$ are live rolls, the load will automatically transfer itself onto the truck $r$.

I claim:

1. A loading device, comprising a rigid frame, the top and bottom longitudinal members of said frame being non-parallel, rolls mounted on the top members of said frame, and adapted to carry the load, means for elevating the forward end of the frame, said means including a crank shaft, means for limiting the degree of throw of the crank-shaft, and said elevating means being also adaptable for lowering the forward end of the frame to initial position.

2. A loading device comprising a rigid frame, the top and bottom longitudinal members of said frame being non-parallel, load carrying rolls mounted on the top members of said frame, a crank-shaft provided with wheels and an operating lever for elevating the forward end of the truck, said operating lever projecting beyond the frame when the forward end of the truck frame is elevated.

3. A loading device comprising a rigid frame, the top and bottom longitudinal members of said frame being non-parallel, load carrying rolls mounted on the top members of said frame, a crank-shaft provided with wheels and an operating lever for elevating the forward end of the truck, stop members against which the crank-shaft abuts for limiting the degree of throw of the crank-shaft, said operating lever projecting beyond the frame when the forward end of the truck frame is elevated.

RALPH S. MAXWELL.